United States Patent [19]

Poster, Jr.

[11] Patent Number: 4,800,588
[45] Date of Patent: Jan. 24, 1989

[54] TELEPHONE NETWORK INTERFACE SYSTEM

[75] Inventor: Thomas J. Poster, Jr., Clemens, Mich.

[73] Assignee: GTE Products Corporation, Danvers, Mass.

[21] Appl. No.: 763,200

[22] Filed: Aug. 7, 1985

[51] Int. Cl.$^4$ .............................................. H04M 9/00
[52] U.S. Cl. ................................... 379/412; 379/399; D13/40; D14/240
[58] Field of Search ................. 179/179, 81 R, 81 C, 179/178, 175.1 R; 361/331, 390, 395, 399, 356, 357, 363, 364; 220/3.8, 20, 22, 242; 339/44 R, 44 M; D10/40; D13/40; D14/52; 379/179, 387, 399, 412, 441, 442; 411/402, 403; 439/535, 521

[56] References Cited

U.S. PATENT DOCUMENTS

| | | | |
|---|---|---|---|
| Des. 287,583 | 1/1987 | Smith et al. | D14/52 |
| 307,106 | 10/1884 | Durant | 379/107 |
| 834,764 | 10/1906 | Scribner | 361/119 |
| 892,167 | 6/1908 | Launbranch | 379/440 |
| 1,247,825 | 11/1917 | Hague | 379/451 |
| 1,302,137 | 4/1919 | Cook | 174/60 |
| 1,884,000 | 10/1932 | Lewis | 361/364 X |
| 2,114,017 | 4/1938 | Dring | 247/14 |
| 2,558,124 | 6/1951 | Burden | 220/20 X |
| 2,584,435 | 2/1952 | Doerr | 220/20 X |
| 2,959,388 | 11/1960 | Fogle | 248/231 |
| 2,968,689 | 1/1961 | Johnson | 174/48 |
| 3,716,815 | 2/1973 | Riches | 439/142 |
| 3,961,229 | 6/1976 | Splitt | 317/120 |
| 4,155,108 | 5/1979 | Tuttle et al. | 361/331 |
| 4,211,128 | 7/1980 | Plumer | 411/910 X |
| 4,213,013 | 7/1980 | Perna | 374/383 |
| 4,231,628 | 11/1980 | Hughes | 439/676 |
| 4,237,342 | 12/1980 | Eller | 379/332 |
| 4,242,721 | 12/1980 | Krolak | 361/415 |
| 4,303,296 | 12/1981 | Spaulding | 339/122 |
| 4,317,154 | 2/1982 | Passarella | 361/119 |
| 4,415,189 | 11/1983 | Kastelic, Jr. | 292/196 |
| 4,438,477 | 3/1984 | Cawley | 361/119 |
| 4,488,008 | 12/1984 | Dellinger | 379/30 |
| 4,560,839 | 12/1985 | Dillard | 379/399 |

OTHER PUBLICATIONS

"Tomorrow's Protection System is Here Today", TII Industries, Inc., TII-333, Universal Network Interface, Copiague, N.Y., Received 2-86.
SNI 2200 Product Brochure, Keptel Inc., Ocean, N.J., 6/1984.
AT & T Information Letter Dated 4/8/82. (Residence Station Systems).
AT & T Information Letter Dated 11/3/82, (700-Type Jacks).

Primary Examiner—Jin F. Ng
Assistant Examiner—Randall S. Vaas
Attorney, Agent, or Firm—Harness, Dickey & Pierce

[57] ABSTRACT

The network interface unit includes a two compartment housing and a pair of commonly hinged covers. The outer cover protects the entire network interface and other telephone utility circuits from the weather, while the inner cover prevents the customer from accessing telephone utility company circuits. The outer cover may be locked in the closed position to the inner cover, and the inner cover is independently secured to the rear of the housing so that authorized telephone technicians can gain access to both compartments without the need to detach the outer and inner covers from one another and without the need to open a customer supplied padlock. The network interface unit housing provides a variety of component mounting structures enabling the housing to hold a variety of different modular components.

57 Claims, 5 Drawing Sheets

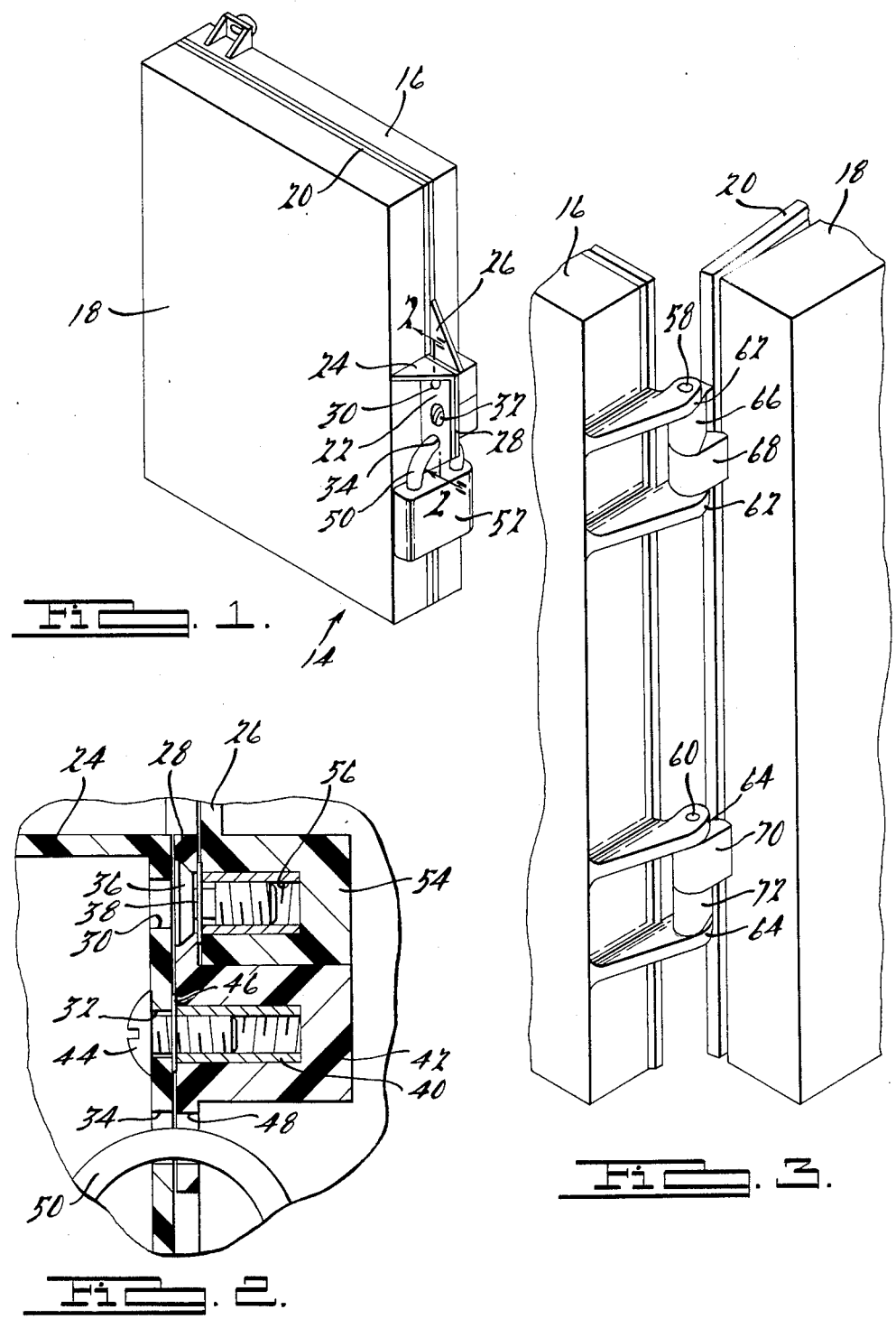

TELEPHONE NETWORK INTERFACE SYSTEM

BACKGROUND AND SUMMARY OF THE INVENTION

This invention relates generally to telephone network interface devices and more particularly to a multipurpose weatherproof network interface system having both a limited access telephone utility compartment and an open access customer compartment.

Historically, the installation and servicing of telephone equipment has been performed by skilled telephone technicians. However, with the recent deregulation of the telephone industry, many telephone customers are purchasing and installing their own telephone equipment. To simplify installation and testing, both for the customer and for the telephone company, a network interface is now customarily provided. The network interface establishes a line of demarcation between the telephone utility company's telephone network, or telephone loop as it is sometimes called, and the customer's premises wiring.

Most present day network interfaces comprise a modular jack and a snap-in miniature plug of the type formed on today's single line telephones. The modular jack is usually coupled through a station protector (for lightening protection) and then to the telephone loop or network via overhead or underground telephone cables. The plug side of the network is usually coupled through a bridging arrangement to the customer's premises wiring. The network interface provides a means for disconnecting the premises wiring, and a convenient test point, which even the customer can use to determine whether a telephone problem is on the customer side or on the telephone company side of the network interface device.

In addition to a station protector, many telephone utility companies also customarily install one or more other utility circuits to the telephone utility side of the network interface. These circuits may include, for example, automatic number identifier (ANI) circuits, ringer isolator circuits, remote isolation devices (RID), and the like. It is customary to locate these additional circuits electrically between the station protector and the network interface; and, hence, these circuits are preferred to be housed with the station protector. For convenience in effecting repairs, it is the preferred practice to locate the network interface, station protector and associated other telephone utility circuits on the exterior of the customer's house or building, where the technician can inspect and repair the circuits without entering the customer's premises.

Since these compartments are located outdoors, it is important that they be shielded from the elements and from nesting insects. The housing should also incorporate a deterrent for unauthorized access by other than the premises occupant, or the telephone utility company. Accordingly, a secure weatherproof and insectproof housing is an important component of a network interface installation. Ideally, the housing should be capable of enclosing the network interface jack and plug, which the customer should have access to, and also the assortment of telephone utility circuits and station protector, which the customer should not have access to. These requirements have not been fully met in present day network interface installations.

Another requirement for a network interface unit stems from the fact that the customer and telephone utility company circuit requirements vary from installation to installation. There has heretofore been no universal network interface installation. For example, station protectors come in various shapes and sizes, depending on the electrical specifications, ratings, and manufacturer. There is also a wide variety of different telephone utility circuits for providing automatic number identifiers, ringer isolation and remote isolation. In some cases, a utility company may find it necessary to install one or more of these devices on a particular customer's line. In addition, some customers may require more than one telephone line, making it desirable to provide several network interfaces in a common enclosure. Present day enclosures are not well adapted to accommodating the wide variety of telephone circuit combinations encountered in the field.

The present invention overcomes the foregoing difficulties encountered in prior art network interface installations. The invention provides a network interface device for housing at least one telephone network interface unit and at least one telephone utility circuit component, such as a station protector, automatic number identifier (ANI), ringer isolator, remote isolation device (RID), and the like. The invention comprises a boxlike rear housing member having an interior partitioning wall defining first and second compartments. The partitioning wall is generally vertically arranged and extends between the top and bottom walls of the rear housing. A means is provided for securing at least one telephone network interface unit within the first compartment. In the presently preferred embodiment, there is sufficient room provided for installing at least two telephone network interface units in the first compartment.

The invention further comprises a means for securing at least one telephone utility circuit component within the second compartment. A raised pad is disposed in the second compartment for supporting one of a number of different station protectors by selecting from a plurality of different mounting holes and registration posts provided. In addition to the mounting pad, the walls which define the second compartment are provided with slot forming means for slidably receiving modular telephone utility circuit components, such as ANI circuits, RID circuits, and ringer isolators which are provided on printed circuit boards which may be encapsulated or potted.

Further, in accordance with the invention, there is provided an inner cover member which is movable between an open position and a closed position by rotation about a pair of vertically aligned hinges on the side of the rear housing member. In the closed position, the inner cover member prevents unauthorized access to the second compartment containing the telephone utility circuits. The inner cover member is constructed with an opening to permit access to the network interface unit or units within the first compartment. Preferably the hinges are disposed on the same side of the rear housing member as the first compartment. To provide a fully weatherproof and insectproof housing, an outer cover member is hingedly secured to the rear housing member for movement between an open position and a closed position. Preferably the outer cover member is vertically hinged to the same two hinge pins which support the inner cover member. In the closed position, the outer cover member prevents access to the first compartment and also to the inner cover member. In the open position, access may be had to the first compartment, but not to the second compartment, unless the inner cover member is also open. The hinge means disposed on the rear housing for rotatably carrying both of the inner and outer cover members secures both cover members for movement about a common generally vertical access.

Still further in accordance with the invention, the outer cover member is provided with a locking means for securing it in a closed position. The locking means preferably includes a threaded fastener which may be opened using conventional hand tools and also preferably includes a padlock receiving aperture which the customer may use to lock the outer cover member closed by securing it to the inner cover member. The inner cover member is in turn provided with a locking means for securing in a closed position to the rear housing member. Preferably the inner cover locking means is provided with a special hexagonal recess having a post disposed in the center of the recess, so that it may not be opened using conventional hand tools. A special hexagonally shaped and axially bored tool is utilized for unlocking the inner cover member when the telephone utility technician must gain access. The locking means for the inner cover is accessible from the exterior of the housing, and unlocking the inner cover locking means with the special tool permits both the inner and outer covers to be swung open about common hinge pins. This may be done without the need to unlock the outer cover member locking means, without the need to separate the inner and outer covers, and without the need to remove the customer installed padlock.

For a more complete understanding of the invention and its many object and advantages, reference may be had to the following specification and to the accompanying drawings.

BRIEF DESCRIPTION OF THE DRAWINGS

FIG. 1 is a perspective view of the invention with the outer cover member closed and locked;

FIG. 2 is a detailed cross-sectional view of the inner and outer cover member locking mechanisms taken substantially along the line 2—2 in FIG. 1;

FIG. 3 is a detailed perspective view of the hinge structure of the invention, illustrating both inner and outer cover members in an open position;

FIG. 6 is a perspective view of the invention illustrating a representative assembly of modular network interface units, station protector and other telephone utility circuits installed, and also illustrating the inner cover member locked to the outer cover member and the two cover members being opened as a unit;

DESCRIPTION OF THE PREFERRED EMBODIMENT

Figure 4:
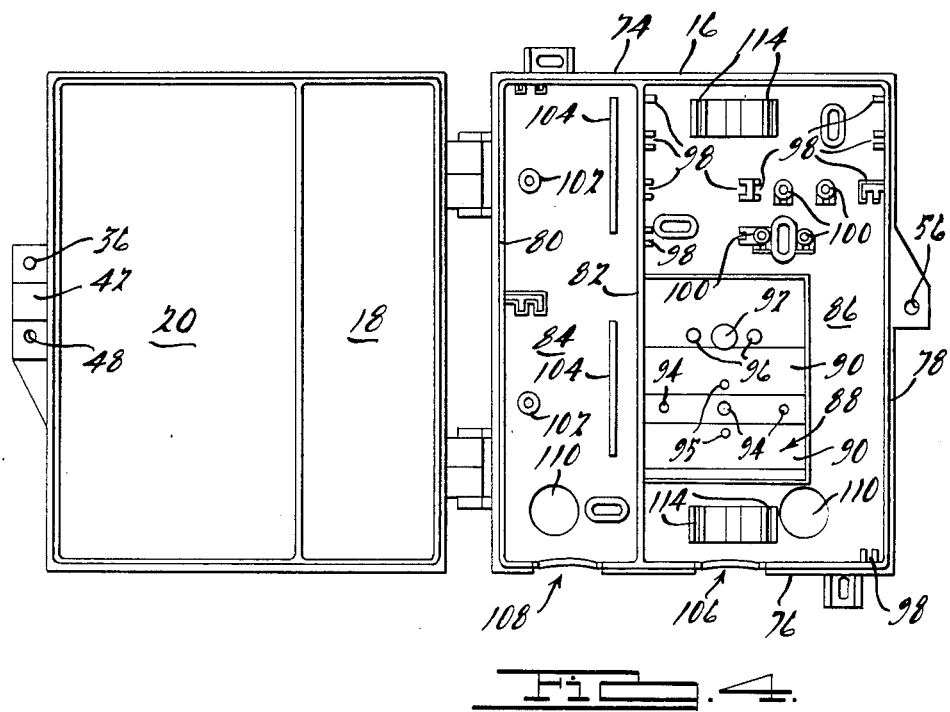
FIG. 4 is a front plan view of the invention showing both cover members fully open and with all telephone network interface units and telephone utility circuits removed.

Referring to FIG. 1, the network interface device of the invention is illustrated generally at 14. The device includes a rear housing member 16, an outer cover member 18, and an inner cover member 20, which is better seen in FIG. 6. Preferably the housing member 16 and cover members 18 and 20 are of plastic. Outer cover member 18 is provided with an outwardly extending locking plate 22 strengthened by web 24. Rear housing member 16 is also provided with an outwardly extending locking plate 26. In a similar fashion, inner cover member 20 is also provided with a locking plate 28 which is sandwiched between locking plates 22 and 26 when the inner and outer covers are closed as shown in FIG. 1. Locking plate 22 is provided with an upper aperture 30, a middle aperture 32 and a lower aperture 34. Apertures 30, 32 and 34 are also shown in FIG. 2.

With continued reference to FIG. 2, locking plate 28 of inner cover member 20 is also provided with three apertures which are in registration with the three apertures of outer cover member 18. The upper aperture of inner cover member 20 carries a threaded locking bolt 36, which may be held in place with split ring 38, so that the locking bolt is permanently secured to locking plate 28, and hence, to inner cover member 20. The middle aperture of inner cover member 20 contains a threaded female collar 40 which extends into a block formation 42 integrally formed on locking plate 28. Female collar 40 is adapted to receive threaded locking bolt 44 which is carried in the middle aperture 32 and may be held in place by split ring 46. Threaded bolt 44 and collar 40, thus, supply the means for securing outer cover member 18 and inner cover member 20 together. Locking plate 28 further improves a padlock aperture 48 which registers with lower aperture 34 to permit the hasp of a customer supplied padlock 52. Apertures 34 and 48, thus, provide an alternate means for locking the inner and outer cover members together.

The locking plate 26 of rear housing member 16 is provided with a block formation 54 integrally formed on the locking plate and positioned adjacent block formation 42. Locking plate 26 is provided with a threaded aperture 56 which registers with the threaded locking bolt 36. By threadedly securing locking bolt 36 in aperture 56, the inner cover member is secured or locked to the rear housing member in a fully closed position. Upper aperture 30 provides an access opening for the insertion of the appropriate key or tool used to unscrew bolt 36 from aperture 56. The preferred configuration of locking bolt 36 and its corresponding tool will be discussed more fully below in connection with FIG. 9.

FIG. 3 illustrates the preferred hinge construction of the invention. As illustrated, outer cover member 18 and inner cover member 20 are hingedly secured to rear housing member 16 by means of upper hinge pin 58 and lower hinge pin 60. Hinge pins 58 and 60 are colinear and cover members 18 and 20, thus, pivot about a common vertical axis. The rear housing member is provided with upper and lower pairs of hinge lugs 62 and 64 which are spaced apart to accommodate the stacked upper hinge journals 66 and 68 and lower hinge journals 70 and 72.

FIG. 4 illustrates the interior of the rear housing member 16 and also the undersides of outer cover member 18 and inner cover member 20. Only a portion of the underside of outer cover member 18 is visible in FIG. 4, the remainder being obscured by inner cover member 20. Rear housing member 16 comprises upper and lower horizontal sidewalls 74 and 76 and right and left vertical sidewalls 78 and 80. An interior partitioning wall 82 extends vertically between upper and lower sidewalls 74 and 76. Preferably all of the sidewalls and partitioning wall 82 are of the same height. Partitioning wall 82 and the sidewalls connect to define a first compartment 84 and a second compartment 86. Disposed in the floor of second compartment 86 is a generally rectangular raised mounting pad 88. The mounting pad is used to support one of an assortment of different commercially available station protectors (not shown). Mounting pad 88 is provided with a pair of shallow recessed channels 90, a deep circular recess 92, three inline mounting holes 94, and a pair of raised guide posts 96. These various mounting holes, recesses and guide posts are positioned to accommodate a variety of different station protectors including but not limited to Western Electric or Northern Telecom Models 123 and 128; TII Models 355 and 356; and GTE/Sylvania Model CP 514. Protector Model 128 is secured using the outermost pair of mounting holes 94. Model 123 is secured using mounting holes 95. Models 355 and 356 are attached using the pair of recessed channels 90 and the center mounting hole 94. Model CP 514 is mounted using guideposts 96 and the deep circular recess 92.

To provide a means for installing one or more telephone utility circuits, such as automatic number identifier circuits, ringer isolation circuits, remote isolation devices, and the like, sidewalls 76, 78 and 80 are provided with slot-forming structures 98. Additional slot-forming structures 98 are formed in posts upstanding from the floor of second compartment 86. These slot-forming structures are adapted to receive printed circuit board cards containing additional telephone utility circuits which may be slidably inserted as needed. A plurality of terminal posts 100 are upstanding from the floor of second compartment 86 to provide termination points or connection points for securing various telephone circuit wiring between the network interface units, the station protector and any additional utility circuits.

First compartment 84 is provided with a plurality of mounting holes 102 and raised guide rails 104 which serve as a means for securing one or more network interface units (not shown). The lower sidewall 76 is provided with a pair of cable entrance openings 106 and 108, opening 106 communicating with second compartment 86 and opening 108 communicating with first compartment 84. Both openings are adapted to receive D-shaped rubber grommets (not shown) and serve as convenient entrance and exit points for the telephone service cable and the customer's premises wiring. The floors of both compartments 84 and 86 are also provided with a plurality of knockouts 110, also seen from the rear of housing member 16 in FIG. 5. These knockouts serve as additional entrance and exit points for telephone cables.

Figure 5:
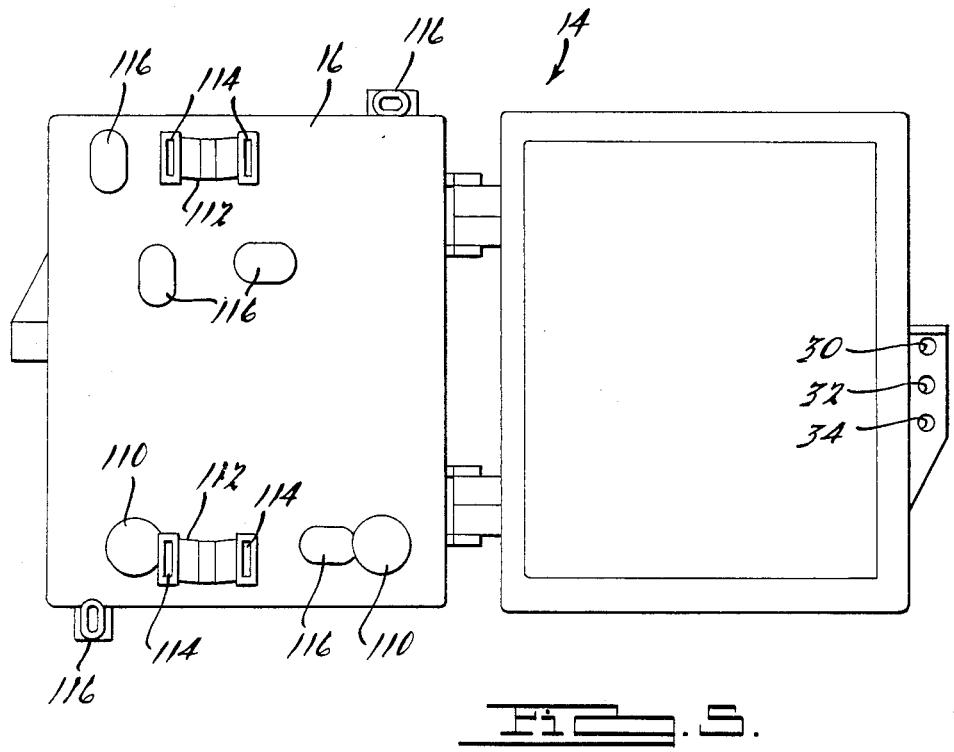
FIG. 5 is a rear plan view of the invention showing the assortment of mounting structures and showing both cover members fully opened.

Referring to FIG. 5, the rear side or underside of rear housing member 16 is provided with a pair of raised fixtures 112 with opposing vertical slots 114 which may be used to secure the network interface device 14 to a vertical pole as with hose clamps. As seen in FIG. 4, slots 114 open into compartment 86 so that the hose clamp straps may pass through the slots and around a vertical mounting pole. In this regard, it may be possible to locate the usual tightening screws within the second compartment where they cannot be readily tampered with. In addition to the fixtures 112, the underside of rear housing 16 is also provided with a plurality of raised mounting lugs 116 which are arranged as shown to provide a variety of different possible mounting arrangements or footprints. The asymetrical arrangement of mounting lugs 116 is used to ensure that the network interface device 14 will find solid footing on a wide variety of different building surfaces, including cinder blocks, bricks, wood siding, aluminum siding, shingles and the like.

Referring now to FIG. 6, the network interface device 14 is illustrated in conjunction with a typical complement of internal components, including a pair of network interface units 118, a station protector 120 and a plurality of additional telephone utility circuit components 122. As illustrated, circuit components 122 are slidably carried in the slot-forming structures 98. Station protector (128-type shown) 120 is secured as with self-tapping screws 124 to pad 88. Cable entrance openings 106 and 108 are both provided with slidably carried D-shaped grommets which may be readily removed by lifting upwardly when inner cover member 20 is in the open position shown. Both network interface units 118 are provided with jacks 128 and plugs 130. In one embodiment, each plug 130 is coupled via cable bridging arrangement 132 to a four post connector 134. Connector 134 provides the customary red, green, yellow and black terminals for connection to the customer's premises wiring. A buckle 136 snaps into engagement with latch 138 to plug 130 firmly in place. By lifting buckle 136 and unplugging plug 130, the telephone utility service may be disconnected from the four post connector 134 (see FIG. 8). Jack 138 remains connected to the telephone utility network via cables 140, which are in turn coupled to terminal posts 100 which connect to the telephone utility through the station protector. With the plug 130 removed, the customer can plug any standard telephone jack 128 to place a test call. If no problem is encountered, but if a problem is encountered when the same call is placed from within the premises, it may be assumed that the fault is in the customer's premises. Thus, the network interface provides a convenient means for localizing a fault. Although the jack and plug arrangement illustrated is a presently preferred embodiment, other plug and jack configurations are also possible.

Figure 8:
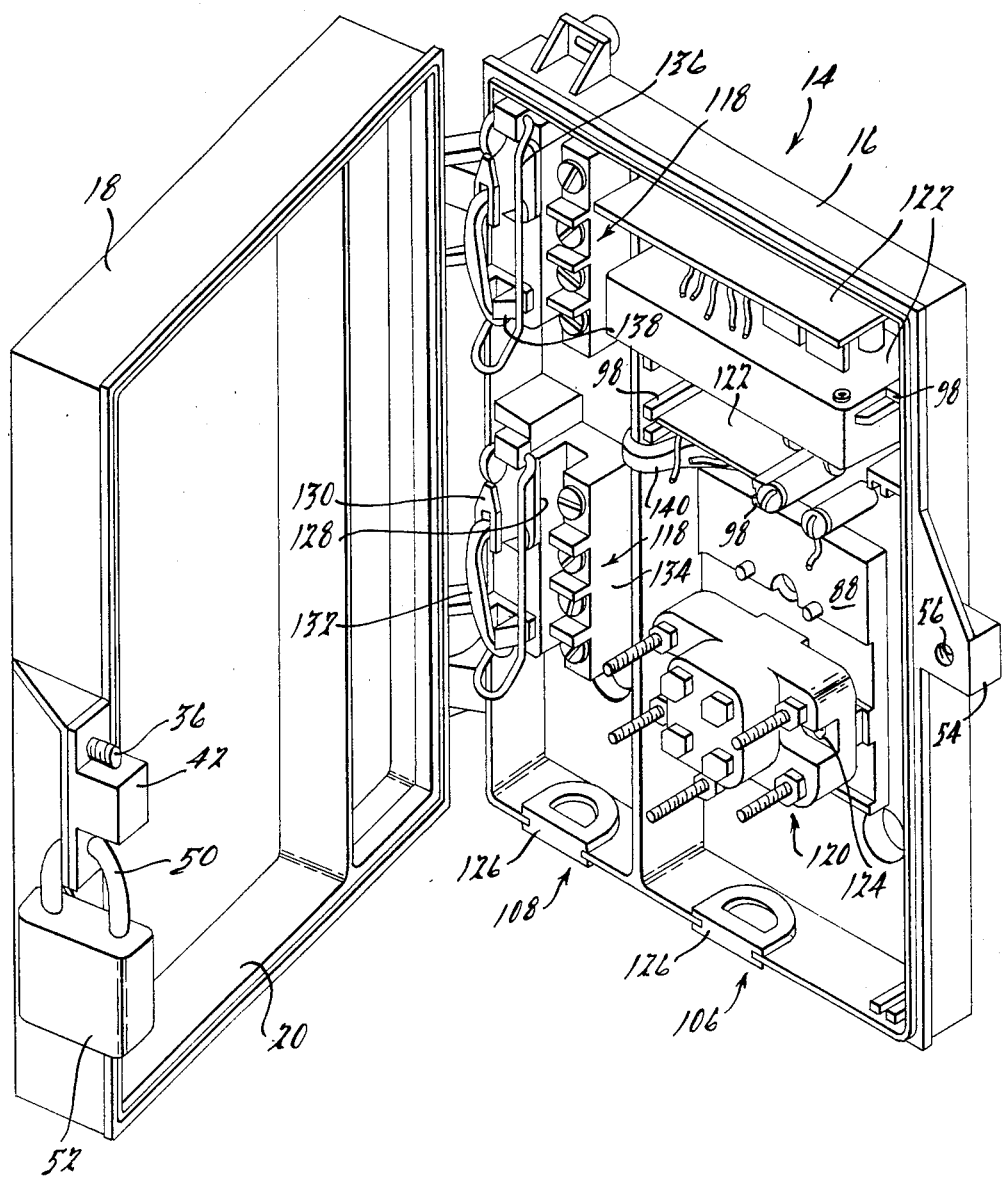
FIG. 8 is a perspective view similar to FIGS. 5 and 6 but showing the inner cover member in the closed and locked position and showing the outer cover member open.
Figure 7:
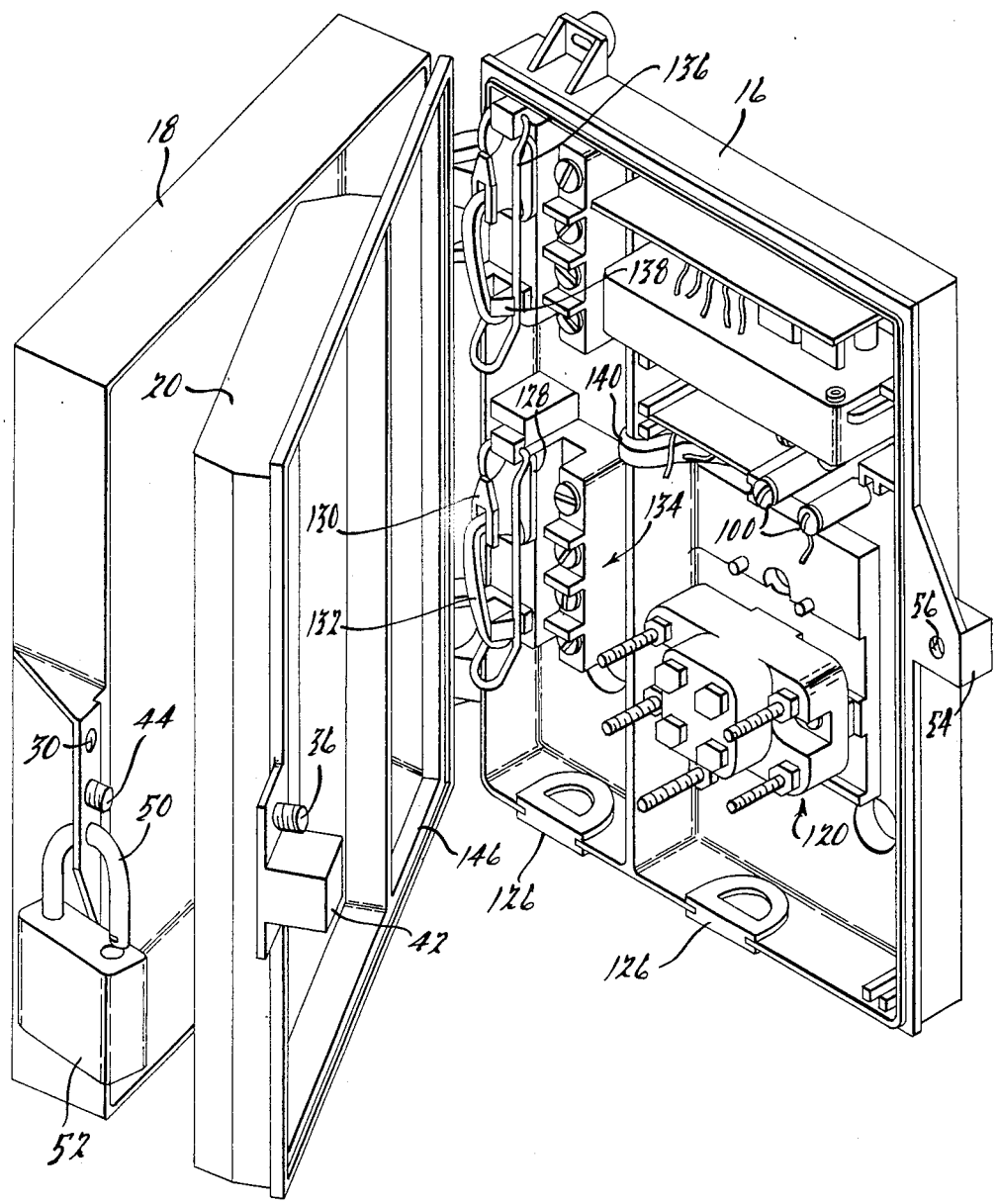
FIG. 7 is a perspective view similar to that of FIG. 5, but showing the inner cover member unlocked and separated from the outer cover member.

FIGS. 7 and 8 further illustrate the manner in which inner and outer cover members work. For a complete understanding, continued reference to FIG. 6 may be had. FIG. 7 illustrates inner cover member 20 in a position separate from outer cover member 18. This is accomplished by unscrewing threaded locking bolt 44 to separate the covers from one another. If provided, the padlock 52 must also be unlocked to separate the covers. FIG. 8 illustrates the network interface device 14 with cover 20 in its closed position. This is the position which the customer normally encounters upon opening outer cover 18. Inner cover 20 is locked or secured in place by tightening threaded locking bolt 36. Threaded locking bolt 36 has a hexagonal recess 142 with a post 144 disposed in the center to prevent a conventional allen wrench from being inserted into the recess. In this fashion, the customer is prevented from gaining access to the second compartment 86 which is covered by inner cover member 20. Outer cover member 18 is not similarly locked and the customer has ready access to first compartment 84 where the network interface units are located. With reference to FIG. 7, note that inner cover member 20 includes an integral supporting frame 146 of a size and shape to mate with the forward periphery of rear housing member 16. FIG. 8 illustrates the supporting frame 146 in its mating position. In this position, grommets 126 are prevented from sliding removal. Thus, the customer is prevented from removing, and possibly losing, the rubber grommets which protect the incoming and outgoing cables, and restrict insect infestation.

Figure 9:
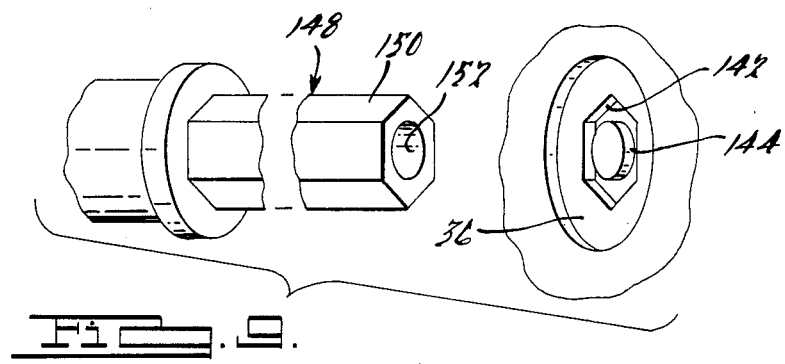
FIG. 9 is a detailed view showing the hexagonal locking member and special tool used to unlock the inner cover member.
Figure 8:
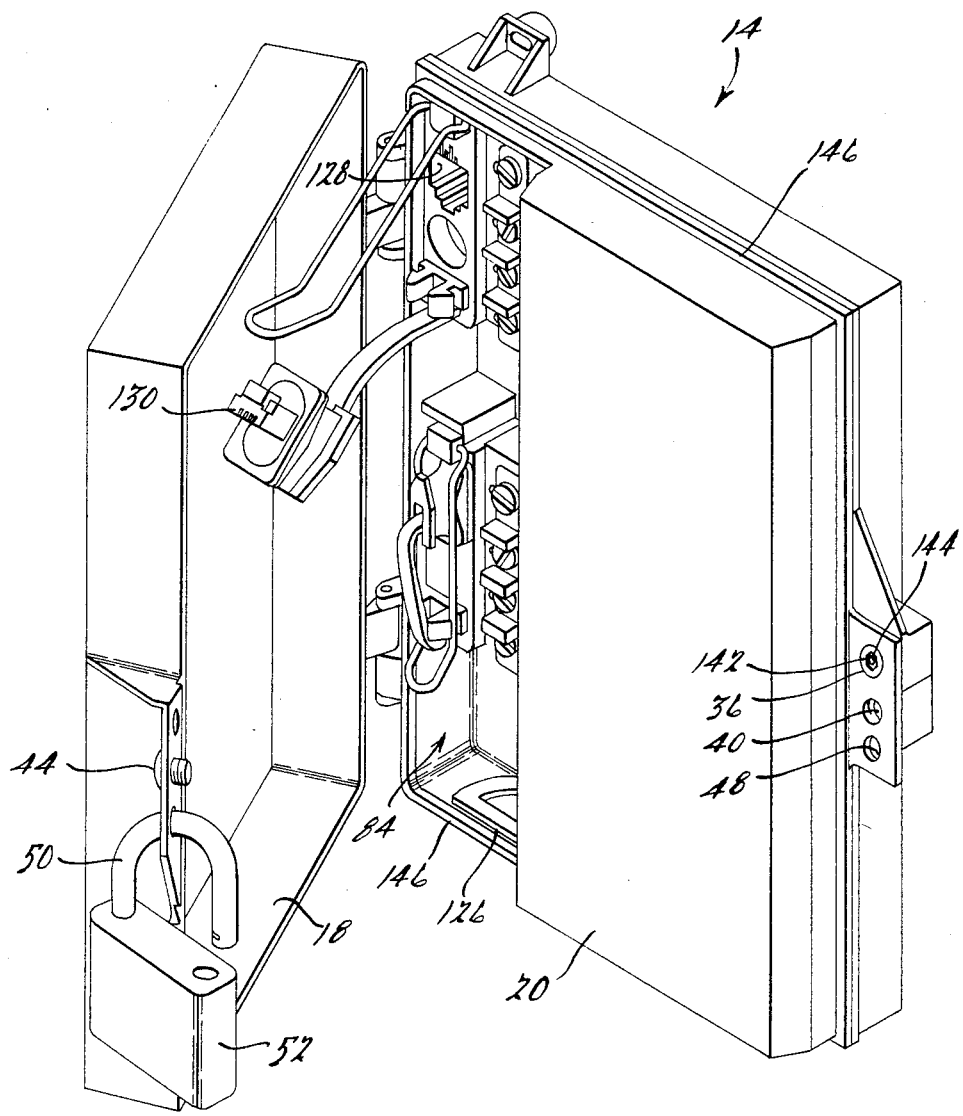

FIG. 9 illustrates the head of threaded locking bolt 36 and the opening key or tool 148 in detail. Tool 148 is preferably fashioned in the form of a screwdriver having a hexagonal shaft sized to made with recess 142 and having an axial bore 152 in the end thereof which is sized and positioned to receive post 144 to thereby permit the insertion of shaft 150 into recess 142. Because tool 148 is not a readily available item, only authorized telephone technicians, who are equipped with the tool, can gain access into the second compartment 86. Note with reference to FIG. 6 that the telephone technician can gain access to the entire network interface device by unscrewing locking bolt 136 using tool 148. As illustrated, it is not necessary for the technician to undo locking bolt 44 or to open padlock 52.

While the invention has been described in its presently preferred embodiment, it will be understood that the invention is susceptible to modification and change without departing from the scope and spirit of the invention as set forth in the appended claims.

What is claimed as novel is:

1. A network interface device for housing at least one telephone network interface unit and at least one telephone utility circuit component, the network interface device comprising:
   a rear housing member having an interior partitioning wall defining first and second compartments;
   a means for securing at least one telephone network interface unit within said first compartment;
   a means for securing at least one telephone utility circuit component within said second compartment;
   an inner cover member movable between an open position and a closed position, in said closed position said inner cover member preventing access to said second compartment;
   an outer cover member movable between an open position and a closed position, in said closed position said outer cover member preventing access to said first compartment and to said inner cover member;
   hinge means disposed on said rear housing for rotatably carrying both of said inner and outer cover members for movement about a common axis; and
   first and second securing means for securing said outer cover member to said inner cover member;
   wherein said rear housing member has sidewalls including at least two cable entrance apertures, one of said cable entrance apertures communicating with said first compartment and another of said cable entrance apertures communicating with said second compartment, wherein each of said apertures includes grommet means slidably removable from said aperture only when said inner cover member is in said open position and being prevented from being slidably removable when said inner cover member is in said closed position.

2. The device of claim 1 further comprising locking means for locking said inner cover member in said closed position.

3. The device of claim 1 wherein the second securing means includes a padlock receiving aperture.

4. The device of claim 1 further comprising threaded locking means for locking said inner cover member in said closed position, said locking means having a head portion accessible from the exterior of said device.

5. The device of claim 1 further comprising threaded locking means for locking said inner cover member in said closed position, said locking means having a head portion with a multisided tool engaging means and a blocking means in the form of a post disposed with said multisided tool engaging means for preventing the engaging of tools with said engaging means.

6. The device of claim 5 further comprising a tool for unlocking said threaded locking means, said tool comprising a multisided shaft sized to mate with said tool engaging means and having an aperture in the end thereof sized and positioned to receive said blocking means and to thereby permit the engagement of said shaft with said engaging means.

7. The device of claim 1 further comprising threaded locking means for locking said inner cover member in said closed position, said locking means having a head portion with a hexagonal recess therein and with a post disposed in the center of said recess for preventing the insertion of an allen wrench into said recess.

8. The device of claim 7 further comprising a tool for unlocking said threaded locking means, said tool comprising a hexagonal shaft sized to mate with said recess and having an axial bore in the end thereof sized and positioned to receive said post and to thereby permit the insertion of said shaft into said recess.

9. The device of claim 1 wherein said rear housing includes a plurality of sidewalls and said device further comprises slot-forming means on said sidewalls for slidably receiving said telephone utility circuit component.

10. The device of claim 9 wherein said inner cover member in said closed position holds said circuit component in said slot-forming means.

11. The device of claim 1 further comprising raised pad mounting means disposed in said second compartment for supporting said circuit component.

12. The device of claim 1 further comprising at least one quick disconnect network interface plug and jack means disposed in said first compartment.

13. The device of claim 1 further comprising at least one bridging connector securable in said first compartment for manually disconnecting telephone service at said network interface.

14. The device of claim 1 further comprising a signal station protector securable in said second compartment.

15. The device of claim 1 further comprising a remote isolation device for disconnecting telephone service from a remote location, said isolation device being securable in said second compartment.

16. The device of claim 1 further comprising a ringer termination circuit securable in said second compartment and means for coupling said termination circuit to said telephone network interface unit.

17. The device of claim 1 further comprising an automatic number identifier circuit securable in said second compartment and means for coupling said identifier circuit to said telephone network interface unit.

18. A network interface device for housing telephone circuit components including at least one network interface unit and a station protector component selected from a group of different types of station protector components, the network interface device comprising:

a rear housing member having a first pair of generally parallel sidewalls, a second pair of generally parallel sidewalls, said first pair of sidewalls being generally orthogonal to said second pair of sidewalls, a back wall and a partitioning wall generally parallel to said first pair of sidewalls and disposed within the interior of said rear housing member and extending between said second pair of sidewalls;

said partitioning wall extending from said back wall and defining first and second compartments within the interior of said rear housing member;

means for securing at least one telephone network interface unit within said first compartment;

means for securing a station protector component within said second compartment; and wherein said means for securing a station protector component comprises pad mounting means disposed on said back wall and having at least one mounting hole for mounting a first selected one type of said station protector component, having at least one guide post for mounting a second selected one type of said station protector component and having at least one recessed channel for mounting a third selected one type of said station protector component.

19. The device of claim 18 further comprising at least two slot-forming means opposite one another on one of said first pair of sidewalls and on said partitioning wall for slidably capturing another of said telephone circuit components.

20. The device of claim 18 further comprising at least two slot-forming means opposite one another on each of said second pair of side walls for slidably capturing another of said telephone circuit components.

21. The device of claim 18 further comprising at least one terminal post means protruding from said back wall and slot-forming means on said post means for slidably carrying another of said telephone circuit components.

22. The device of claim 18 wherein said means for securing a station protector component comprises a raised pad mounting means disposed on said back wall and wherein said sidewalls and said partitioning wall are of a height relative to said raised pad such that a substantial portion of a station protector secured on said pad is presented above said sidewalls and partitioning wall for easy manual access.

23. A network interface device for housing telephone utility circuit components including at least one network interface unit, the network interface device comprising:

a rear housing member having sidewalls and a floor and an interior partitioning wall and defining first and second compartments;

a means for securing at least one network interface unit with said first compartment;

a means for securing at least one telephone utility circuit component within said second compartment;

an inner cover member secured by hinge to said rear housing and adapted for closing said second compartment;

an outer cover member secured by hinge to said rear housing and adapted for closing said first compartment and for covering said inner cover; and means disposed on said rear housing member for mounting said device to a fixed structure, said mounting means including raised fixture means for mating with a mounting pole and having slotted apertures disposed on opposite sides of said raised fixture and communicating with said second compartment for receiving mounting straps accessible in said second compartment for securing said network interface device to a mounting pole.

24. The device of claim 23 wherein said rear housing member has an exterior side and said mounting means further comprises a plurality of raised mounting lugs disposed on said exterior side of said rear housing member.

25. The device of claim 24 wheren said mounting lugs are asymmetrically arranged on said exterior side to provide a plurality of mounting positions for different fixed structures.

26. The device of claim 23 wherein said mounting means comprises knockout means for providing means for cable entrance.

27. A network interface device for housing at least one telephone network interface unit and at least one telephone utility circuit component, the network interface device comprising:

a rear housing member having a plurality of side walls and having an interior partitioning wall defining first and second compartments;

at least one of said side walls including at least one cable entrance aperture communicating with said first compartment and at least one of said side walls including at least one cable entrance aperture communicating with said second compartment;

grommet means slidably carried in each of said cable entrance apertures;

a means for securing at least one telephone network interface unit within said first compartment;

a means for securing at least one telephone utility circuit component within said second compartment;

an inner cover member movable between an open position and a closed position, in said closed position said inner cover member preventing access to said second compartment and preventing the sliding removal of each of said grommet means from said cable entrance aperture;

an outer cover member movable between an open position and a closed position, in said closed position said outer cover member preventing access to said first compartment and to said inner cover member; and hinge means disposed on said rear housing for rotatably carrying both of said inner and outer cover members for movement about a common axis.

28. A network interface device for housing at least one telephone network interface unit and at least one telephone utility circuit component, the network interface device comprising:

a rear housing member having an interior partitioning wall defining first and second compartments;

a means for securing at least one telephone network interface unit within said first compartment;

a means for securing at least one telephone utility circuit component within said second compartment;

an inner cover member movable between an open position and a closed position, in said closed position said inner cover member preventing access to said second compartment;

an outer cover member of a size to substantially cover said inner cover member and movable between an open position and a closed position, in said closed position said outer cover member preventing access to said first compartment and to said inner cover member;

hinge means disposed on said rear housing for rotatably carrying both of said inner and outer cover members for movement about a common axis;

first and second securing means for securing said outer cover member to said inner cover member; and threaded locking means for locking said inner cover member in said closed position, said locking means having a head portion accessible from the exterior of said device.

29. The device of claim 28 wherein said second securing means includes a padlock receiving aperture.

30. The device of claim 28 further comprising threaded locking means for locking said inner cover member in said closed position, said locking means having a head portion with a multisided tool engaging means and a blocking means in the form of a post disposed within said multisided tool engaging means for preventing the engaging of tools with said engaging means.

31. The device of claim 30 further comprising a tool for unlocking said threaded locking means, said tool comprising a multisided shaft sized to mate with said tool engaging means and having an aperture in the end thereof sized and positioned to receive said blocking means and to thereby permit the engagement of said shaft with said engaging means.

32. The device of claim 28 further comprising threaded locking means for locking said inner cover member in said closed position, said locking means having a head portion with a hexagonal recess therein and with a post disposed in the center of said recess for preventing the insertion of an allen wrench into said recess.

33. The device of claim 32 further comprising a tool for unlocking said threaded locking means, said tool comprising a hexagonal shaft sized to mate with said recess and having an axial bore in the end thereof sized and positioned to receive said post and to thereby permit the insertion of said shaft into said recess.

34. The device of claim 28 wherein said rear housing includes a plurality of sidewalls and said device further comprises slot-forming means on said sidewalls for slidably receiving said telephone utility circuit component.

35. The device of claim 34 wherein said inner cover member in said closed position holds said circuit component in said slot-forming means.

36. The device of claim 28 further comprising raised pad mounting means disposed in said second compartment for supporting said circuit component.

37. The device of claim 28 further comprising at least one quick disconnect interface plug and jack means disposed in said first compartment.

38. The device of claim 28 further comprising at least one bridging connector securable in said first compartment for manually disconnecting telephone service at said network interface.

39. The device of claim 28 further comprising a signal station protector securable in said second compartment.

40. The device of claim 28 further comprising a remote isolation device for disconnecting telephone service from a remote location, said isolation device being securable in said second compartment.

41. The device of claim 28 further comprising a ringer termination circuit securable in said second compartment and means for coupling said termination circuit to said telephone network interface unit.

42. The device of claim 28 further comprising an automatic number identifier circuit securable in said second compartment and means for coupling said identifier circuit to said telephone network interface unit.

43. A network interface device for housing at least one telephone network interface unit and at least one telephone utility circuit component, the network interface device comprising:

a rear housing member having an interior partitioning wall defining first and second compartments;

a means for securing at lest one telephone network interface unit within said first component;

a means for securing at least one telephone utility circuit component within said second compartment;

an inner cover member movable between an open position and a closed position, in said closed position said inner cover member preventing access to said second compartment;

an outer cover member of a size to substantially cover said inner cover member and movable between an open position and a closed position, in said closed position said outer cover member preventing access to said first compartment and to said inner cover member;

hinge means disposed on said rear housing for rotatably carrying both of said inner and outer cover members for movement about a common axis;

first and second securing means for securing said outer cover member to said inner cover member; and wherein said rear housing includes a plurality of sidewalls and said device further comprises slot-forming means on said sidewalls for slidably receiving said telephone utility circuit component, wherein said inner cover member in said closed position holds said circuit component in said slot-forming means.

44. The device of claim 43 further comprising locking means for locking said inner cover member in said closed position.

45. The device of claim 43 wherein said rear housing member has a sidewall including at least one cable entrance aperture and a grommet means slidably carried in said aperture, said grommet being slidably removable when said inner cover member is in said open position and being prevented from being slidably removable when said inner cover member is in said closed position.

46. The device of claim 43 wherein said second securing means includes a padlock receiving aperture.

47. The device of claim 43 further comprising threaded locking means for locking said inner cover member in said closed position, said locking means having a head portion with a multisided tool engaging means and a blocking means in the form of a post disposed adjacent said multisided tool engaging means for preventing the engaging of tools with said engaging means.

48. The device of claim 47 further comprising a tool for unlocking said threaded locking means, said tool comprising a multisided shaft sized to mate with said tool engaging means and having a aperture in the end thereof sized and positioned to receive said blocking means and to thereby permit the engagement of said shaft with said engaging means.

49. The device of claim 43 further comprising threaded locking means for locking said inner cover member in said closed position, said locking means having a head portion with a hexagonal recess therein and with a post disposed in the center of said recess for preventing the insertion of an allen wrench into said recess.

50. The device of claim 49 further comprising a tool for unlocking said threaded locking means, said tool comprising a hexagonal shaft sized to mate with said recess and having an axial bore in the end thereof sized and positioned to receive said post and to thereby permit the insertion of said shaft into said recess.

51. The device of claim 43 further comprising raised pad mounting means disposed in said second compartment for supporting said circuit component.

52. The device of claim 43 further comprising at least one quick disconnect interface plug and jack means disposed in said first compartment.

53. The device of claim 43 further comprising at least one bridging connector securable in said first compartment for manually disconnecting telephone service at said network interface.

54. The device of claim 43 further comprising a signal station protector securable in said second compartment.

55. The device of claim 43 further comprising a remote isolation device for disconnecting telephone service from a remote location, said isolation device being securable in said second compartment.

56. The device of claim 43 further comprising a ringer termination circuit securable in said second compartment and means for coupling said termination circuit to said telephone network interface unit.

57. The device of claim 43 further comprising an automatic number identifier circuit securable in said second compartment and means for coupling said identifier circuit to said telephone network interface unit.

* * * * *

UNITED STATES PATENT AND TRADEMARK OFFICE
CERTIFICATE OF CORRECTION

PATENT NO. : 4,800,588
DATED : January 24, 1989
INVENTOR(S) : Thomas J. Poster, Jr.

It is certified that error appears in the above-identified patent and that said Letters Patent is hereby corrected as shown below:

Title page:

U.S. Patent Documents:
4,242,721 "12/1980" should be --12/1960--

| | |
|---|---|
| Column 1, line 25, | "formed" should be --found--. |
| Column 1, line 29, | insert "interface" after --network--. |
| Column 4, line 37, | insert "50" after --hasp--. |
| Column 6, line 31, | insert "hold" after --to--. |
| Column 6, line 34, | "Jack 138" should be --Jack 128--. |
| Column 6, line 39, | insert "into" after --telephone--. |
| Column 7, line 14, | "made" should be --mate--. |
| Column 7, line 23, | "136" should be --36--. |
| Column 8, line 4, | "the" 2nd occurrence should be --said--. |
| Column 8, line 14, | "with" should be --within--. |
| Column 9, line 59, | "with" should be --within--. |

UNITED STATES PATENT AND TRADEMARK OFFICE
CERTIFICATE OF CORRECTION

PATENT NO. : 4,800,588

DATED : January 24, 1989

INVENTOR(S) : Thomas J. Poster, Jr.

It is certified that error appears in the above-identified patent and that said Letters Patent is hereby corrected as shown below:

Column 10, line 15,     "wheren" should be --wherein--.

Column 12, line 19,     "lest" should be --least--.

Column 12, line 20,     "component" should be --compartment--.

Signed and Sealed this

Twenty-eighth Day of November 1989

*Attest:*

JEFFREY M. SAMUELS

*Attesting Officer*     *Acting Commissioner of Patents and Trademarks*